United States Patent [19]

Sherman

[11] 4,397,988

[45] * Aug. 9, 1983

[54] BLENDS OF P-METHYLSTYRENE POLYMER AND DIENE-STYRENE OR DIENE-(P-METHYLSTYRENE) BLOCK COPOLYMERS

[75] Inventor: Anthony M. Sherman, Edison, N.J.

[73] Assignee: Mobil Oil Corporation, New York, N.Y.

[ * ] Notice: The portion of the term of this patent subsequent to Jun. 23, 1998, has been disclaimed.

[21] Appl. No.: 370,773

[22] Filed: Apr. 22, 1982

[51] Int. Cl.³ .................... C08L 53/02; C08L 25/06; C08L 25/08

[52] U.S. Cl. .......................................... 525/98; 525/95

[58] Field of Search ................................ 525/98, 95

[56] References Cited

U.S. PATENT DOCUMENTS 4,255,531 3/1981 Arbit ................................... 525/227
4,275,179 6/1981 Sherman .............................. 525/98

Primary Examiner—Carman J. Seccuro
Attorney, Agent, or Firm—Charles A. Huggett; Michael G. Gilman; Edward J. Trojnar

[57] ABSTRACT

Blends of conjugated diene-styrene or diene-(p-methylstyrene) block copolymers and polymers of p-methylstyrene. The blends exhibit excellent physical and optical properties.

18 Claims, No Drawings

BLENDS OF P-METHYLSTYRENE POLYMER AND DIENE-STYRENE OR DIENE-(P-METHYLSTYRENE) BLOCK COPOLYMERS

CROSS-REFERENCE TO RELATED APPLICATIONS

My U.S. Pat. No. 4,275,179 issued June 23, 1981, which is incorporated herein by reference, discloses and claims certain blends of poly(p-methylstyrene) and styrene-diene block copolymers. A. U.S. Patent application by J. Murray, Ser. No. 335,779, filed Dec. 30, 1981 now U.S. Pat. No. 4,352,908 issued Oct. 5, 1982, discloses blends of poly(p-methylstyrene) or polystyrene with (p-methylstyrene)-diene-styrene block copolymers.

FIELD OF THE INVENTION

This invention is directed to blends of conjugated diene-styrene or diene-(p-methylstyrene) block copolymers and p-methylstyrene homopolymers or copolymers.

DESCRIPTION OF THE PRIOR ART

Styrene-diene block copolymers are known and blends thereof with both crystal polystyrene and impact polystyrene are described in an article by H. L. Hsieh and R. H. Burr, *Modern Plastics*, April 1982, page 84, which is incorporated herein by reference.

SUMMARY OF THE INVENTION

This invention is directed to blends of p-methylstyrene homopolymer or copolymer and a conjugated diene-styrene or conjugated diene-(p-methylstyrene) block copolymer containing about 10–60% conjugated diene, and 40–90% by weight of styrene or p-methylstyrene.

DETAILED DESCRIPTION OF THE INVENTION

An essential monomer component in preparing one or both polymers used in this invention is p-methylstyrene. It is within the contemplation of this invention to use mixtures of methylstyrene isomers rich in p-methylstyrene. Such mixtures contain at least 90 weight percent, preferably 95 weight percent, more preferably 97 or greater weight percent, p-methylstyrene and less than 0.1 weight percent o-methylstyrene with the balance being m-methylstyrene. A typical mixture contains, by weight, about 97 percent p-methylstyrene, about 3 percent m-methylstyrene, and about 0.05 percent o-methylstyrene. The mixtures are obtained by catalytic dehydrogenation of the mixtures of ethylmethyl benzene isomers described in U.S. Pat. No. 4,086,287 which is incorporated herein by reference. Homopolymers and copolymers prepared from p-methylstyrene are prepared in the known manner utilizing methods analogous to those long used for the preparation of polystyrene and styrene copolymers. The preparation of poly(p-methylstyrene) polymers and random copolymers of styrene and p-methylstyrene is described in U.S. Pat. No. 4,306,049 which is incorporated herein by reference.

The conjugated dienes employed in the block copolymer preferably have from 4–8 carbon atoms per molecule and still more preferably from 4–5 carbon atoms. Thus, the preferred species are butadiene and isoprene, although methylisoprene and other conjugated dienes may be utilized, as well as mixtures thereof. Representative block copolymers are polystyrene-polybutadiene, polystyrene-isoprene, poly(p-methylstyrene)-polybutadiene and poly(p-methylstyrene)-polyisoprene as well as hydrogenated derivatives of these polymers.

The hydrogenated materials may be hydrogenated to any desired extent, although the substantially complete hydrogenation of at least the conjugated diene polymer block is desirable. In any event, if hydrogenation is resorted to, it is desired to reduce the original unsaturation of the block copolymer by at least about 50% and preferably by at least about 90%. The reasons for hydrogenation are broadly two-fold in that hydrogenation increases the stability of the product and raises the softening point as well.

The block copolymer generally will contain between about 40 weight percent to about 90 weight percent poly(p-methylstyrene) or styrene, and 10 to 60 weight percent conjugated diene. The diene content of the block copolymer may vary outside these ranges but it is preferred that the diene content be selected so that the block copolymer is hard and resinous as opposed to rubbery as occurs with high diene content.

The p-methylstyrene polymer can be a polymer prepared exclusively from methylstyrene isomers having the required high para-content or copolymers which contain p-methylstyrene as the predominant monomer. Useful comonomers include acrylic monomers, particularly acrylonitrile, acrylic acid and methacrylic acid esters such as methyl methacrylate.

The styrene-diene block copolymers are known materials which are commercially available. Certain analogous (p-methylstyrene)-diene block copolymers are disclosed in U.S. Pat. No. 4,260,694 which is incorporated herein by reference. In general, the block copolymers can take any of a variety of forms generally described in the Hsieh et al., *Modern Plastics* article referred to at page 1. These forms, in which S represents a styrene or p-methylstyrene block and D represents a diene block, include the S-D, S-D-S and "star" configurations described in the article. A representative styrene-butadiene block copolymer is available from Phillips Petroleum Co. under the trade name "K-Resin".

The weight ratio of the block copolymer and the other polymer, copolymer or mixtures thereof can be varied widely, generally within the ratio of 10:90 to 90:10 and more specifically in the range of 1:3 to 3:1.

Blending of the polymers is accomplished by procedures well known in the art including mixing solutions of the polymers in a suitable solvent, toluene for instance, and precipitating the blend; and mixing in a Brabender mixer, extruder or in a 2-roll differential speed mixer.

The blends of this invention exhibit high light transmission and low haze. In general, the blends will have significantly better light transmission and lower haze than the corresponding composition in which the block copolymer is blended with a styrene polymer instead of para-methylstyrene polymer.

The blends are particularly suited for applications in which high clarity is desirable, for example, in containers such as cups and the like. Such articles can advantageously be made by forming the blend into a sheet and subsequently thermoforming.

The invention is illustrated by the following non-limiting examples.

EXAMPLE

A blend of 50 weight percent of crystal polystyrene resin (Dow XP-6079) and a block copolymer of styrene and butadiene having a 76/24 styrene/butadiene ratio ("K-resin" KR-05, Phillips) was prepared by extrusion compounding and pelletizing. The pellets were injection molded into samples. Similarly samples were prepared using, instead of polystyrene, poly(p-methylstyrene) resin (polymerized from a methylstyrene isomer mixture containing about 97 percent para and 3 percent ortho isomer). The molded samples were tested for physical properties. Test results are set forth in the Table below. The polystyrene samples are designated PS and the poly(p-methylstyrene) samples PPMS.

TABLE

|  | PS | PPMS |
|---|---|---|
| MECHANICAL PROPERTIES | | |
| Tensile Modulus, $10^5$ psi | 3.05 | 2.84 |
| Tensile Strength @ Yld., $10^3$ psi | 4.66 | 4.54 |
| Tensile Strength @ Brk., $10^3$ psi | 3.50 | 3.48 |
| Elongation @ Brk., % | 15 | 17 |
| Flexural Modulus, $10^5$ psi | 3.30 | 2.88 |
| Flexural Strength, $10^3$ psi | 6.92 | 6.70 |
| Izod Impact Strength, ft-lb/in | 0.2 | 0.2 |
| Gardner Impact Strength, in-lb | 4.2 | 2.6 |
| Rockwell Hardness, L | 55 | 47 |
| THERMAL PROPERTIES | | |
| Vicat Soft. Temp., °C. | 101 | 102 |
| DTUL, °C. | 83 | 86 |
| MFR (G), g/10' | 8.0 | 10.5 |
| OPTICAL PROPERTIES | | |
| Transmission, % | 72 | 80 |
| Haze, % | 14 | 12 |

From the data in the Table, it will be noted that the physical properties of the two blends were generally similar. Unexpectedly, however, the optical properties of the blend containing poly(p-methylstyrene) are extremely better, with higher light transmission and lower haze.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

I claim:

1. A polymer blend comprising
    A. 10 to 90 parts by weight of a polymer comprising polymerized methylstyrene isomers as its major constituent in which the methylstyrene isomers include at least 90% of the para isomer; and
    B. 90 to 10 parts by weight of a block copolymer of a conjugated diene and either styrene or methyl styrene, but not both, which block copolymer is selected from the group consisting of
        a block copolymer of greater than 40 to 60 weight % of a conjugated diene and from 40 to less than 60 weight % styrene;
        a block copolymer of 10 to less than 20 weight % of a conjugated diene and from greater than 80 to 90 weight % styrene; and
        a block copolymer of 10 to 60 weight % conjugated diene, and 40 to 90 weight % methylstyrene isomers having a para content of at least 90%.
2. A polymer blend comprising
    A. 10 to less than 40 parts by weight of a polymer comprising polymerized methylstyrene isomers as its major constituent in which the methylstyrene isomers include at least 90% of the para isomer; and
    B. 90 to greater than 60 parts by weight of a block copolymer of 10 to 60 weight % conjugated diene, and 40 to 90 weight % of either styrene or methylstyrene isomers, but not both, in which said methyl styrene isomers have a para content of at least 90%.
3. The polymer blend of claim 1 having lower haze and higher optical transmission than the corresponding blend in which (A) is sytrene polymer.
4. The polymer blend of claim 1 in which (B) is a block copolymer containing styrene.
5. The polymer blend of claim 1 in which (B) is a block copolymer containing para-methylstyrene.
6. The blend of claim 1 in which (A) is a polymer consisting of polymerized methylstyrene isomers.
7. An article made by forming a sheet from the blend of claim 1 and thermoforming the article.
8. The polymer blend of claim 2 having lower haze and higher optical transmission than the corresponding blend in which (A) is styrene polymer.
9. The polymer blend of claim 2 in which (B) is a block copolymer containing styrene.
10. The polymer blend of claim 2 in which (B) is a block copolymer containing para-methylstyrene.
11. The blend of claim 2 in which (A) is a polymer consisting of polymerized methylstyrene isomers.
12. An article made by forming a sheet from the blend of claim 2 and thermoforming the article.
13. A polymer blend comprising
    A. greater than 70 to 90 parts by weight of a polymer comprising polymerized methylstyrene isomers as its major constituent in which the methylstyrene isomers include at least 90% of the para isomer; and
    B. less than 30 to 10 parts by weight of a block copolymer of 10 to 60 weight % conjugated diene, and 40 to 90 weight % of either styrene or methylstyrene isomers, but not both, in which said methyl styrene isomers have a para content of at least 90%.
14. The polymer blend of claim 13 having lower haze and higher optical transmission than the corresponding blend in which (A) is styrene polymer.
15. The polymer blend of claim 13 in which (B) is a block copolymer containing styrene.
16. The polymer blend of claim 13 in which (B) is a block copolymer containing para-methylstyrene.
17. The blend of claim 13 in which (A) is a polymer consisting of polymerized methylstyrene isomers.
18. An article made by forming a sheet from the blend of claim 13 and thermoforming the article.

* * * * *